United States Patent
Benes

(10) Patent No.: US 7,261,633 B2
(45) Date of Patent: Aug. 28, 2007

(54) UNITARY PIVOTING SPREADER APPARATUS

(75) Inventor: Jason M. Benes, Grand Island, NE (US)

(73) Assignee: CNH America LLC, New Holland, PA (US)

( * ) Notice: Subject to any disclaimer, the term of this patent is extended or adjusted under 35 U.S.C. 154(b) by 289 days.

(21) Appl. No.: 11/058,664

(22) Filed: Feb. 15, 2005

(65) Prior Publication Data

US 2006/0183519 A1    Aug. 17, 2006

(51) Int. Cl.
*A01F 12/30*    (2006.01)

(52) U.S. Cl. ..................................... 460/111

(58) Field of Classification Search ............... 460/111, 460/901, 112; 239/605, 171, 176, 424, 136
See application file for complete search history.

(56) References Cited

U.S. PATENT DOCUMENTS

| | | | | |
|---|---|---|---|---|
| 2,684,690 A * | 7/1954 | Lee | .................. | 137/601.08 |
| 2,708,582 A * | 5/1955 | Adams | .................. | 239/650 |
| 2,854,046 A | 9/1958 | Devorak | .................. | 56/192 |
| 3,149,449 A | 9/1964 | Mulder | .................. | 56/192 |
| 3,181,290 A | 5/1965 | Van der Lely | .................. | 56/372 |
| 3,186,460 A | 6/1965 | Frederick | .................. | 239/650 |
| 3,350,017 A | 10/1967 | Howell et al. | .................. | 239/660 |
| 3,815,823 A * | 6/1974 | Johnson | .................. | 239/650 |
| 3,822,534 A * | 7/1974 | Martin | .................. | 56/13.9 |
| 5,569,081 A | 10/1996 | Baumgarten et al. | .................. | 460/12 |
| 6,082,647 A * | 7/2000 | Claes | .................. | 241/186.3 |
| 6,220,532 B1 * | 4/2001 | Manon et al. | .................. | 239/672 |
| 6,238,286 B1 * | 5/2001 | Aubry et al. | .................. | 460/111 |
| 6,251,009 B1 | 6/2001 | Grywacheski et al. | .................. | 460/112 |
| 6,331,142 B1 | 12/2001 | Bischoff | .................. | 460/112 |
| 6,554,701 B1 * | 4/2003 | Wolters | .................. | 460/101 |
| 6,729,953 B2 | 6/2004 | Bueermann | .................. | 460/112 |
| 6,775,968 B2 | 8/2004 | Carlot et al. | .................. | 56/192 |
| 6,939,221 B1 | 9/2005 | Redekop et al. | | |
| 2002/0072400 A1 | 6/2002 | Foth | .................. | 460/112 |

FOREIGN PATENT DOCUMENTS

| EP | 0212270 | | 3/1987 |
|---|---|---|---|
| EP | 331784 A1 | * | 9/1989 |

* cited by examiner

*Primary Examiner*—Arpád Fábián Kovács
(74) *Attorney, Agent, or Firm*—Michael G. Harms; John William Stader

(57) ABSTRACT

Spreader apparatus for a crop residue chopper of an agricultural harvesting machine or combine, mountable in a simple manner and quickly and precisely pivotable sidewardly, and optionally upwardly and downwardly, in a unitary manner, for adjusting or varying a direction and/or one or more characteristics of discharge of crop residue propelled from a chopper. The spreader apparatus includes a spreader board having vanes mounted thereon for guiding crop residue flow discharged from the chopper, the vanes and the spreader board being movable simultaneously and in a unitary manner, to achieve adjustments or shifts in crop residue deposition location, without altering consistency or uniformity of the crop residue distribution.

19 Claims, 10 Drawing Sheets

UNITARY PIVOTING SPREADER APPARATUS

TECHNICAL FIELD

This invention relates generally to spreader apparatus for a crop residue chopper of an agricultural harvesting machine or combine, and more particularly, to spreader apparatus which is mountable in a simple manner and quickly and precisely pivotable sidewardly, and optionally upwardly and downwardly, in a unitary manner, for adjusting or varying a direction and/or one or more other characteristics of a flow of crop residue propelled from a chopper.

BACKGROUND ART

Currently, agricultural harvesting machines such as combines typically include a chopper which can be used for chopping and/or propelling crop residue onto a harvested field, which will typically include stalks, leaves and cobs separated from corn or maize; straw and chaff separated from wheat and other grasses; and stalks, leaves and pods of legumes such as soybeans. In many instances it is desirable for the crop residue to be spread as evenly as possible over the width of the harvested swath, to avoid problems resulting from uneven spreading, such as, but not limited to, difficulty in passage of fall tillage tools through residue clumps or thick areas; uneven insulation of the field resulting in uneven field warming and thawing and weed or crop emergence during the following planting season; and increased rodent and insect habitat.

Known choppers typically include a plurality of rotary knives or flails which propel the crop residue within a housing of the chopper and against fixed knives or bars, so as to be chopped thereby, and outwardly through a discharge outlet of the housing optionally, the fixed knives or bars can be removed or retracted, such that the crop residue is propelled directly outwardly through the discharge outlet, without being chopped, which is desirable, for instance, when harvesting corn or maize. The term chopper as used herein refers to devices both with, and without, fixed knives or bars. It is known to provide a residue spreader or distributor for guiding airborne flight of the crop residue from the chopper for distribution over a field, for instance, in a pattern having an adjustable sideward extent or width, which can be, for instance, adjusted to have a width about equal to the width of a header and thus a harvested swath of a field. Reference in this regard, Baumgarten et al. U.S. Pat. No. 5,569,081; and Bischoff U.S. Pat. No. 6,331,142.

Combine headers having a width of 30 feet are currently well known, and headers having widths of 36 feet are also known. As noted above, in many instances it is desirable to uniformly or evenly cover a harvested field. Thus, for optimum performance, the sideward distance that a spreader should be capable of guiding crop residue is important, as is the uniformity or pattern of the spread. Further, the accuracy of the placement of the crop residue in relation to a harvested swath is important, as it is generally not desirable to distribute the crop residue in a manner so as to leave uncovered strips or areas of the swath, double covered areas, or to spread the residue in an adjacent area of unharvested crops so as to be possibly inducted into and processed by the machine. It has been found, however, that such uniform coverage can be difficult to achieve when conditions vary, which conditions can include winds, particularly cross winds; the contours of a field or obstacles therein require following curved swaths; and when turning is required, such as in the headlands of a field. Typically, when cross wind conditions are present, the sideward alignment of a pattern of crop residue deposition will have to be adjusted when harvesting machine changes direction. Reference in this regard, U.S. Pat. No. 5,569,081, which attempts to overcome this problem using a complex, multiple linkage arrangement involving servomotor controls for controlling the positions of guiding plates or vanes of the spreader for making adjustments to compensate for wind. Automatic directional control is also addressed in Bueermann U.S. Pat. No. 6,729,953, which also uses a complex linkage arrangement for this purpose.

An observed disadvantage of such known spreader apparatus is that sideward adjustment of the locations of the edges of a pattern of crop residue deposited on a field, for instance, for aligning with edges of a swath of harvested crops, is made by adjusting the sideward extent or width of the pattern. This is typically done by changing an angle or upward and downward tilt of the spreader apparatus about a horizontal axis, and/or by moving the guiding plates or vanes sidewardly. In this latter regard, the known apparatus rely on relatively complex adjustment mechanisms for the guiding plates or vanes, in addition to other mechanisms or apparatus for supporting the spreader itself, such as hinges, locking devices, and the like, for upward and downward movement. Some of such mechanisms have been found to have less than desirable durability and require more frequent than desirable adjustment. Operationally, other possible shortcomings of using such complex linkage arrangements include that end play and manufacturing tolerances may make precise adjustments more difficult and time consuming. And, altering the sideward position or orientation of vanes may undesirably change one or more characteristics of the pattern of residue deposition, such as the uniformity or consistence of coverage, or the like.

Thus, what is sought is a spreader apparatus for a chopper which is quickly and precisely operable and adjustable for sidewardly positioning or aligning a pattern of crop residue deposition on a field responsive to, or, in anticipation of, conditions such changes in wind direction and/or velocity, and/or changes in direction of movement and the like, which is simpler than known constructions, including in terms of mounting, and which avoids one or more shortcomings and problems of the prior art devices.

SUMMARY OF THE INVENTION

What is disclosed is spreader apparatus for a crop residue chopper of an agricultural harvesting machine or combine, which spreader apparatus is quickly and precisely pivotable in a unitary manner for varying a direction of discharge of crop residue propelled from a chopper, for such purposes as aligning a pattern of crop residue deposition on a field responsive to, or, in anticipation of, conditions such changes in wind direction and/or velocity, and/or changes in direction of movement and the like, which is simpler than known constructions, and avoids or overcomes one or more shortcomings and problems of the prior art devices. In terms of pivotability, the spreader is sidewardly pivotable, and can optionally be pivotable upwardly and downwardly, both in a unitary manner to allow a wide range of options for adjustment.

According to a preferred aspect of the invention, the spreader includes a spreader board including a surface having a plurality of vanes extending therealong defining a plurality of crop residue flow channels arranged in a row along the surface. The spreader includes a pivot mount adapted to be mounted on a harvesting machine or a crop residue chopper, for supporting the spreader board with the row of the crop residue flow channels extending at least generally horizontally across a discharge outlet of the crop residue chopper such that at least a substantial portion of a flow of crop residue propelled outwardly from the outlet will flow through the flow channels guided by the vanes so as to be deposited on a field on which the machine is located. The pivot mount supports the spreader board and the vanes for unitary pivotal movement sidewardly about an upwardly and downwardly extending pivotal axis, to allow simultaneously altering an angular position of the spreader board and the vanes about the pivotal axis. Additionally, the spreader preferably further includes an actuator connectable between a harvesting machine or a crop residue chopper and the spreader board, controllably operable for jointly pivoting the spreader board and the vanes about the pivotal axis, and holding them in a desired orientation or position. Also preferably, the pivot mount is configured to allow unitary pivotal movement of the spreader board and the vanes about a generally horizontal pivotal axis, which is also preferably actuator controlled, to provide an additional direction of movement, for instance, to allow increasing a sideward extent or width of a pattern of crop residue deposition on a field, for instance, for matching the width of a wider or narrower swath resulting from use of a wider or narrower header.

According to another preferred aspect of the invention, the pivot mount comprises an L or T shape pivot member having an upwardly and downwardly extending end received for pivotal movement about the pivotal axis in a bushing or other rotatable support member mounted on the housing, and a generally horizontal end received in a bushing or rotatable support member mounted on the spreader board, to thereby allow unitary pivotability of the spreader board and the vanes about the upwardly and downwardly extending pivotal axis and the horizontal pivotal axis. The actuators are preferably each connected to the housing or rear end of the machine and the spreader board by pivots, more preferably double pivots or Hooke's joints or the like in the former regard, to facilitate the pivotal movement of the spreader board without binding.

Still further, the vanes can be fixed in position on the spreader board, or can be adjustably mounted thereon, to allow achieving a desired spread pattern.

DETAILED DESCRIPTION OF THE INVENTION

Figure 1:
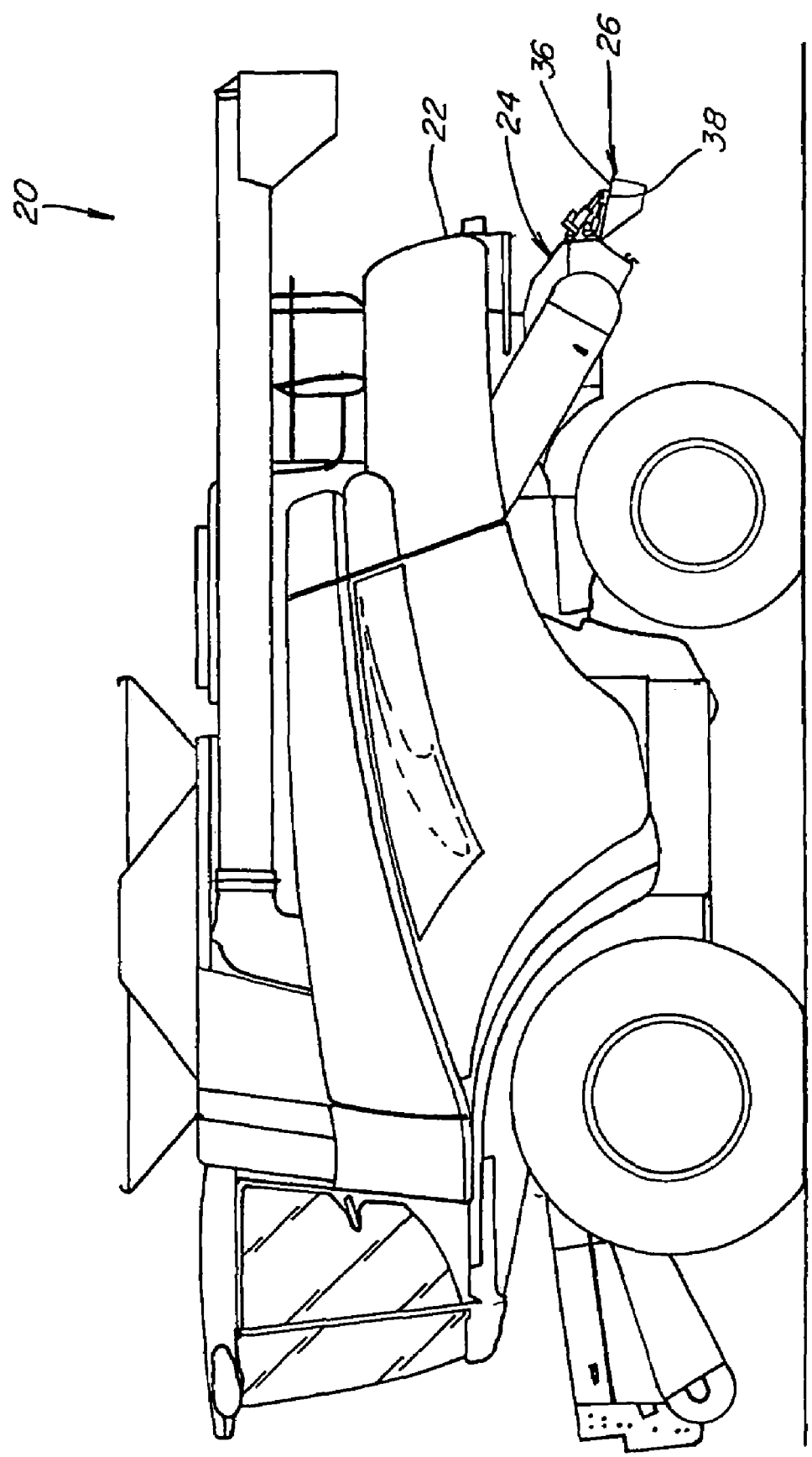
FIG. 1 is a simplified, side view of an agricultural combine including a crop residue chopper including a spreader according to the present invention.

Referring now to the drawings, wherein preferred embodiments of the present invention are shown, in FIG. 1 a self-propelled agricultural combine 20 is shown, including a rear end 22 having a crop residue chopper 24 mounted thereon in the conventional manner, and operable for propelling a flow of crop residue therefrom, for deposition in a desired pattern over a field by a spreader 26 constructed and operable according to the teachings of the present invention.

Figure 2:
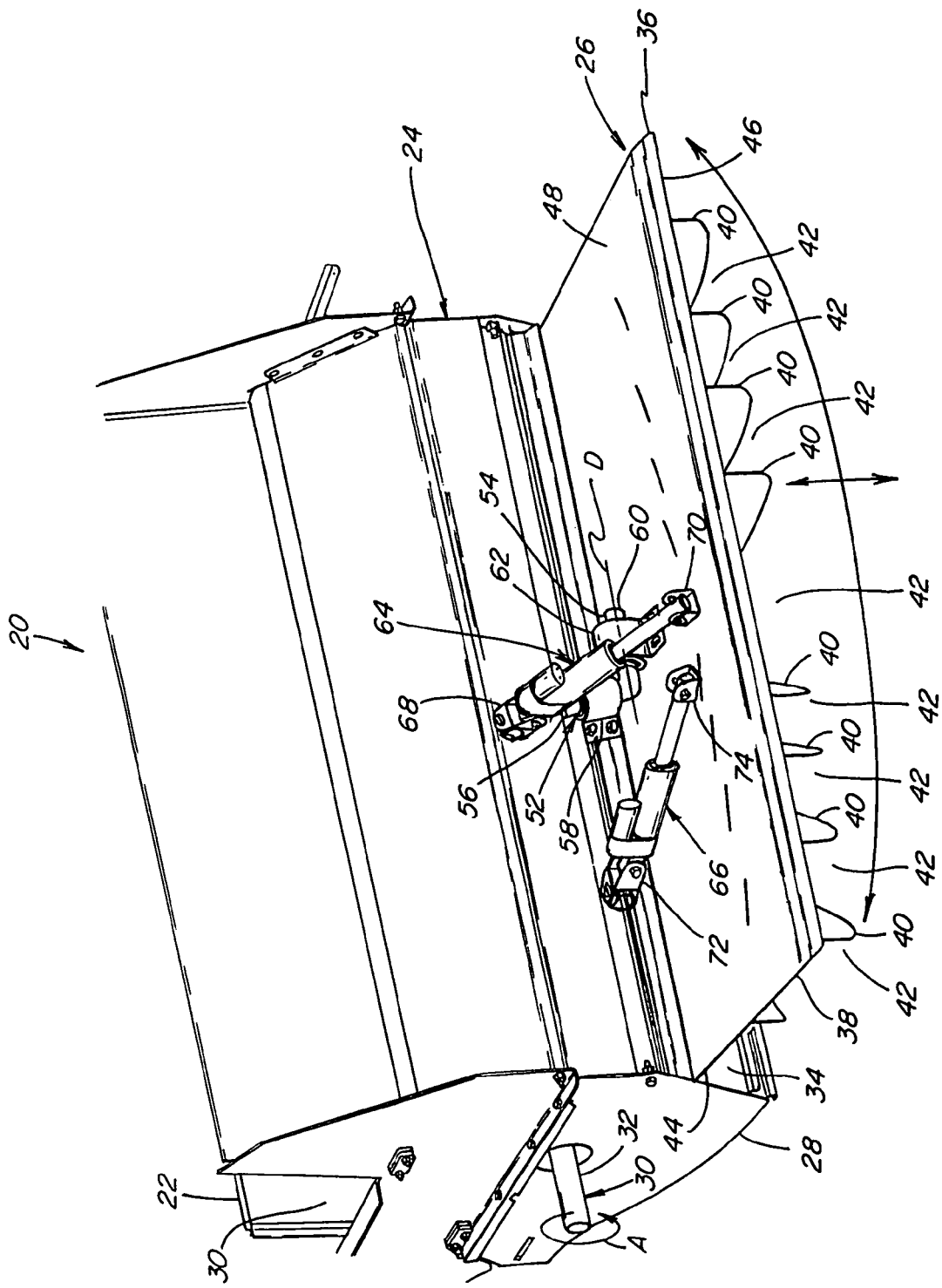
FIG. 2 is a fragmentary perspective view of the rear of the combine of FIG. 1, showing the chopper and the spreader, and illustrating possible directions of movement of the spreader.

Referring also to FIG. 2, chopper 24 includes a housing 28 which receives a flow of crop residue through a forward opening 30, from a threshing system (not shown) of combine 20. Housing 28 contains a rotary device 30 powered by combine 20 and including a rotatably driven shaft 32, which carries a plurality of knives or flails (also not shown) for rotation in the direction indicated by arrow A, for propelling the crop residue through housing 28 and outwardly therefrom through a discharge outlet 34. Housing 28 contains a plurality of fixed knives or bars (not shown) against which the crop residue is propelled en route to outlet 34, for chopping the crop residue, although the knives or bars can be removed, retracted or deleted such the crop residue will be propelled from chopper 24 unchopped, all in the well known manner.

Figure 3:
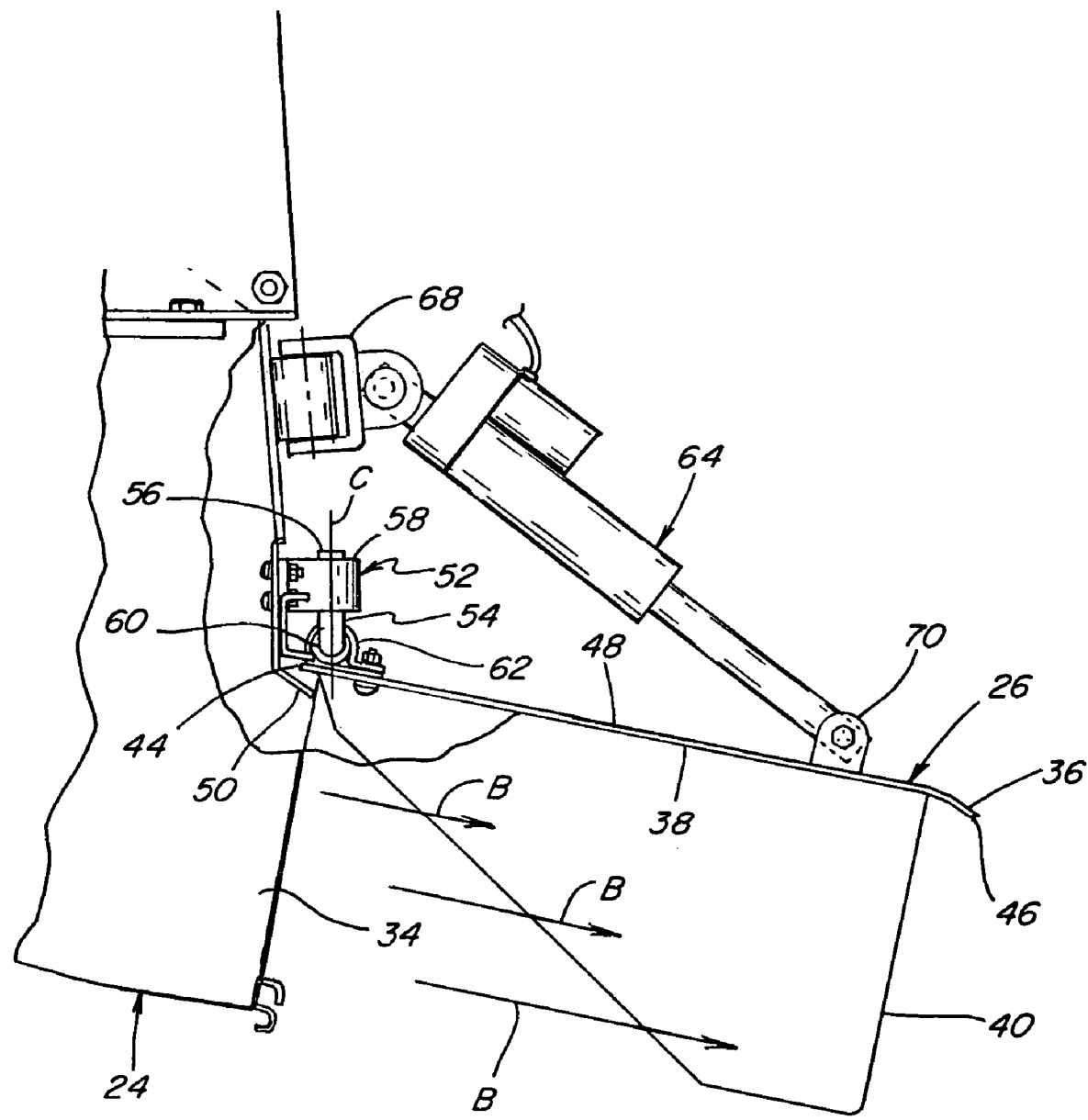
FIG. 3 is fragmentary side view of the chopper and spreader of FIG. 1.

Referring also to FIG. 3, spreader 26 of chopper 24 includes a spreader board 36 which is of rigid construction, for instance of sheet metal or like material, including a surface 38 having a plurality of vanes 40 extending therealong defining a plurality of crop residue flow channels 42 arranged in a row along surface 38. Spreader board 36 has a sidewardly extending first or upstream edge 44, and a sidewardly extending opposite second or downstream edge 46, vanes 40 extending therebetween. Spreader board 36 is preferably positioned and used with surface 38 and vanes 40 directed downwardly as shown, and with an opposite surface 48 extending upwardly, with upstream edge 44 located adjacent to a sidewardly extending edge 50 of housing 28 defining an upper periphery of discharge outlet 34. In this position, vanes 40 extend downwardly into the flow of crop residue through outlet 34, denoted by arrows B in FIG. 3, for guiding the flow through flow channels 42, such that the crop residue will be deposited on a field in a desired pattern, particularly having a desired sideward extent and uniformity of coverage.

Spreader board 36 is preferably mounted to and supported on housing 28 or the rear end of combine 20 by a single pivot mount 52, so as to extend in the above described manner sidewardly at least generally horizontally across discharge outlet 34, such that vanes 40 are positioned for guiding the crop flow for deposition on a field in a desired pattern. Single pivot mount 52 is advantageous as it simplifies construction, and provides the ability to pivot the spreader board 36 and vanes 40 simultaneously and in a unitary manner, about an upwardly and downwardly extending first pivotal axis C, for achieving a desired positioning of a crop residue spread pattern on a field, without requiring altering characteristics of the pattern itself. Primarily, this will typically be in terms of alignment of the sideward edges of the pattern with desired locations in relation to a swath of a field just harvested by combine 20, as will be explained. Pivot mount 52 preferably includes an L shape pivot member 54 having an upstanding end 56 supported for rotation about first pivotal axis C (FIG. 3), in a bushing 58 or other element which allows pivotal movement thereof, mounted on housing 28 using common bolts or other fasteners. Alternatively, bushing 58 could be mounted at a suitable location on the rear end of combine 20. Pivot member 54 includes a generally horizontal cylindrical end 60 oriented so as to extend sidewardly about a generally horizontal second pivotal axis D (FIG. 2) and received in a bushing 62 or other element which allows pivotal movement thereof, mounted on spreader board 36. As a result, spreader board 36 and vanes 40 are jointly and simultaneously pivotable in a unitary manner about either or both of the pivotal axes C and D, supported by the single pivot mount 52.

As noted above, it is desired in many instances to distribute the crop residue discharged by chopper 24 substantially evenly over the width of, and in alignment with, a swath of the field from which the crop has just been harvested by combine 20, which width is typically defined by the overall width of a header of combine 20, which width can be as much as 30 to 40 feet in the instance of some headers currently in use. Thus, it is desirable that a spreader such as spreader 26 have the capability to guide and distribute crop residue propelled by chopper 24 over a field in an even or uniform pattern having a sideward extent equal to about the width of the header. The sideward extent and uniformity of the pattern of deposition can be achieved by setting the positions or angular orientation of the individual vanes 40 which guide the crop residue flows, by adjusting the speed of operation of chopper 24, and/or by setting the angle of the spreader board 36 and vanes 40 about horizontal axis D. Vanes 40 can be preset or fixed permanently in position, or they can be adjustably fixable in position, using common elements such as clamps, fasteners, or the like.

Under no or low wind conditions, aligning the sideward position or location of the pattern of crop residue deposition relative a swath through a field can be a simple matter of aligning spreader board 36 with a forwardly and rearwardly extending centerline of combine 20. However, when wind conditions are sufficient for affecting the location of crop residue deposition, for instance when blowing sidewardly, and/or frequently changing, some adjustments will likely be necessary to maintain or achieve the desired alignment with the swath. Adjustments will also be required when turning and changing direction.

To enable making adjustments easily and quickly, spreader 26 is controllably pivotable about axis D by an actuator 64, and about axis C by an actuator 66, both connected between housing 28 and spreader board 36. Actuator 64 is controllably extendable for pivoting spreader board 36 and vanes 40 together in a unitary manner downwardly about pivot mount 52 and axis D for lowering downstream edge 46, and is retractable for pivoting spreader board 36 and vanes 40 upwardly about axis D for raising edge 46. Actuator 66 is controllably extendable for pivoting spreader board 36 and vanes 40 together in a unitary manner sidewardly about pivot mount 52 and axis C toward the right side when viewed in FIG. 2, and is retractable for pivoting spreader board 36 and vanes 40 toward the left side. These orientations could be reversed, as desired. Actuators 64 and 66 are each preferably a linear actuator and can be electrically or fluid powered, as controlled in the well known conventional manner by operator controls in the operator cab of combine 20, to extend and retract. Actuators 64 and 66 could alternatively be rotary actuators or the like.

Actuator 64 has one end pivotally connected by a pivotable element such as a double pivot 68, to chopper 24 at a location above and generally axially aligned with pivotal axis C through pivot mount 52, and an opposite end connected by a pivot 70 to spreader board 36. This allows pivotal movement upwardly and downwardly as caused by actuator 64 itself, and also freedom to pivot sidewardly with sideward pivotal movement of spreader board 36, as caused by actuator 66. Similarly, actuator 66 has an end connected by a double pivot 72 to chopper 24 and an opposite end connected by a pivot 74 to spreader board 36. This allows sideward pivoting as caused by actuator 66 itself, and freedom for upward and downward pivoting by actuator 64. As a result, spreader board 36 and vanes 40 are supported by single pivot mount 52, and can be controllably pivoted about both axes C and D, as required for achieving a desired crop residue placement and/or alignment on a field, and held in the selected position by actuators 64 and 66. Here, it should be noted that, alternatively, the ends of actuators 64 and 66 could be connected to the chopper housing with other pivotal elements, such as Hooke's joints or the like, to provide the desired pivotability.

Figure 4:
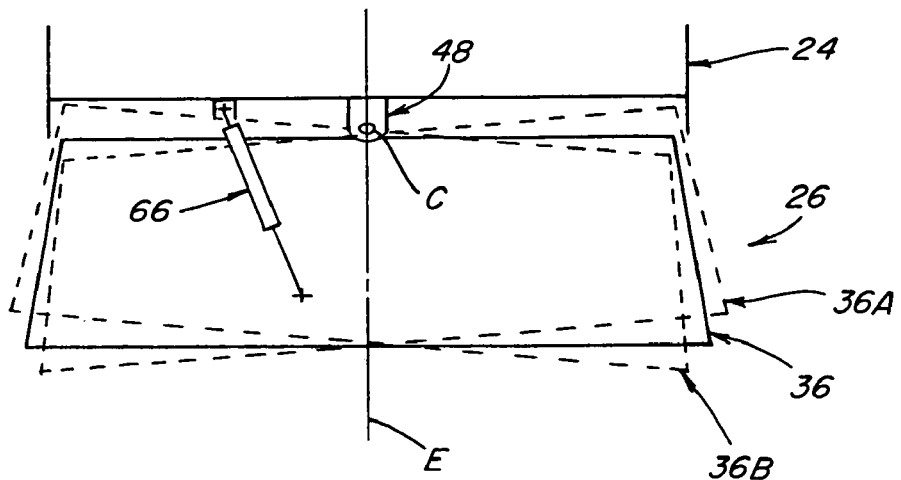
FIG. 4 is a simplified schematic top view of the chopper and spreader of FIG. 1, the spreader being in a straight ahead position, and the spreader being illustrated in dotted lines in alternative positions.

FIGS. 4 through 10 illustrate the utility of the pivotability of spreader 26 according to the invention. More particularly, FIG. 4 illustrates sideward pivotability of spreader 26 about pivotal axis C relative to chopper 24, as supported by pivot mount 52 and controlled by actuator 66. Spreader board 36 is shown in solid lines in a straight ahead position centered about a centerline E; in dotted lines 36A pivoted to the right; and in dotted lines 36B pivoted to the left.

Figure 5:
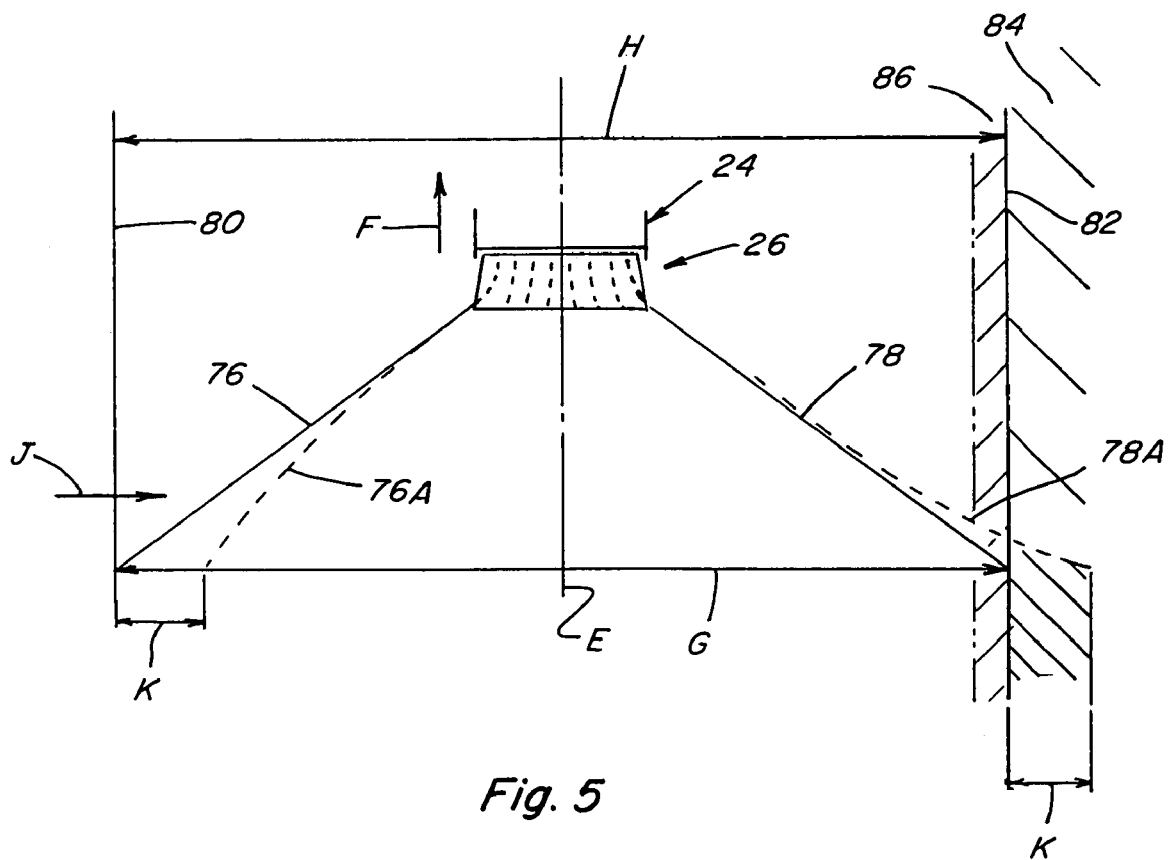
FIG. 5 is a simplified schematic top view of the chopper and spreader with the spreader in the straight ahead position, illustrating a discharge pattern of crop residue therefrom onto a field under no cross wind conditions, and in dotted lines illustrating effects of a cross wind condition on the location of deposition of the crop residue onto the field.

In FIG. 5, spreader 26 is illustrated in a straight ahead position relative to chopper 24, centered about centerline E of the chopper and combine, and moving in a forward direction, denoted by arrow F. Side edges of a flow of crop residue, guided by spreader 26 are denoted by lines 76 and 78. A sideward extent of a pattern of deposition of the crop residue flow on a field is denoted by arrow G. Side edges of a harvested swath of a field are denoted by lines 80 and 82. The swath has a sideward extent, denoted by arrow H. An adjacent region of unharvested crops is denoted by shaded region 84 beside edge 82. Unharvested crops leaning over edge 82 into the swath are denoted by shaded region 86. A left to right side cross wind is denoted by arrow J. An expected resulting shift of the edges of the flow of crop residue is denoted by dotted lines 76A and 78A. The shift has an extent denoted by arrows K. This illustrates that in the event of such a cross wind, and resultant shift in airborne flow of crop residue, a significant portion of a flow of crop residue (denoted by extent K on the right side) can be deposited in an adjacent region of unharvested crops, and a portion of the harvested swath can be left uncovered (denoted by extent K on the left side). A similar cross wind in the opposite direction can cause a similar result. A disadvantage of such a shift and resulting depositing crop residue on an area of unharvested crop, is that at least some of the crop residue will be inducted into the combine when that area is harvested. Absence of crop residue on areas of a harvested field can result in warmer ground compared to adjacent areas, such that crops planted in the adjacent areas may grow unevenly and weeds may emerge early compared to other areas of the field.

Figure 6:
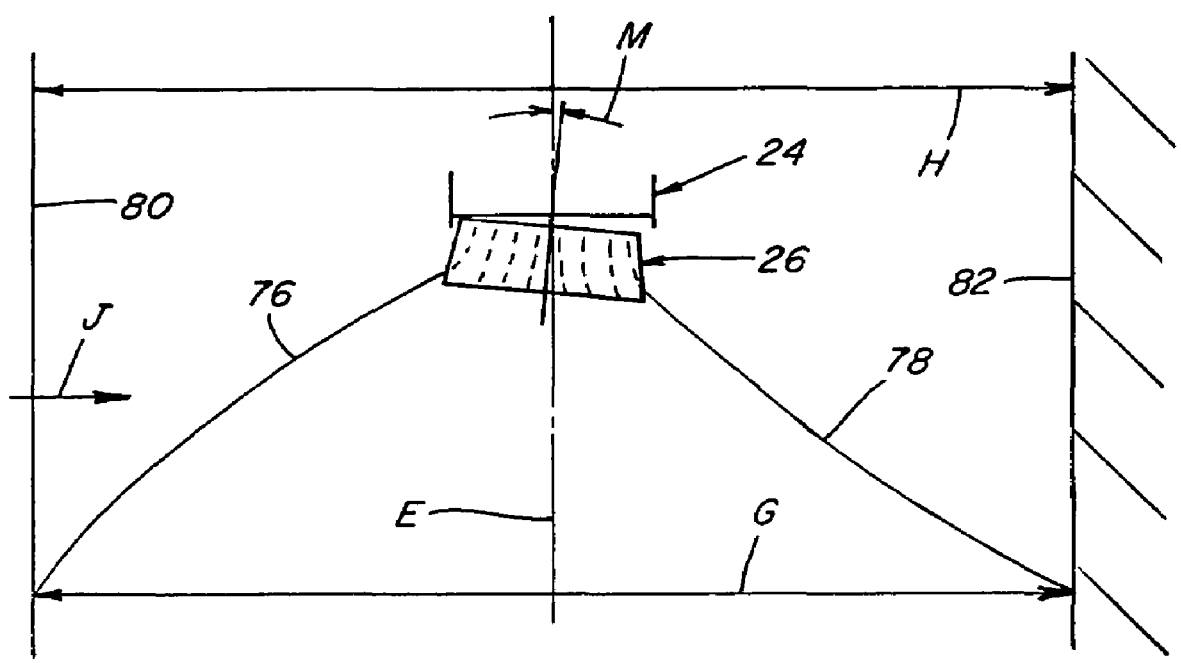
FIG. 6 is another simplified schematic top view of the chopper and spreader, with the spreader angularly related to the straight ahead position, illustrating a discharge pattern of crop residue therefrom onto a field for correcting for cross wind conditions.

FIG. 6 illustrates pivoting of spreader 26 sidewardly to the left by an angle M relative to centerline E, to shift the location of the pattern of crop residue deposition to compensate or correct for side wind J, such that side edges 76 and 78 of the crop residue flow align with edges 80 and 82 of the swath. Sideward extents G and H are equal, and the positions of individual vanes of the spreader have not been changed, such that the crop residue pattern remains consistently the same.

Figure 7:
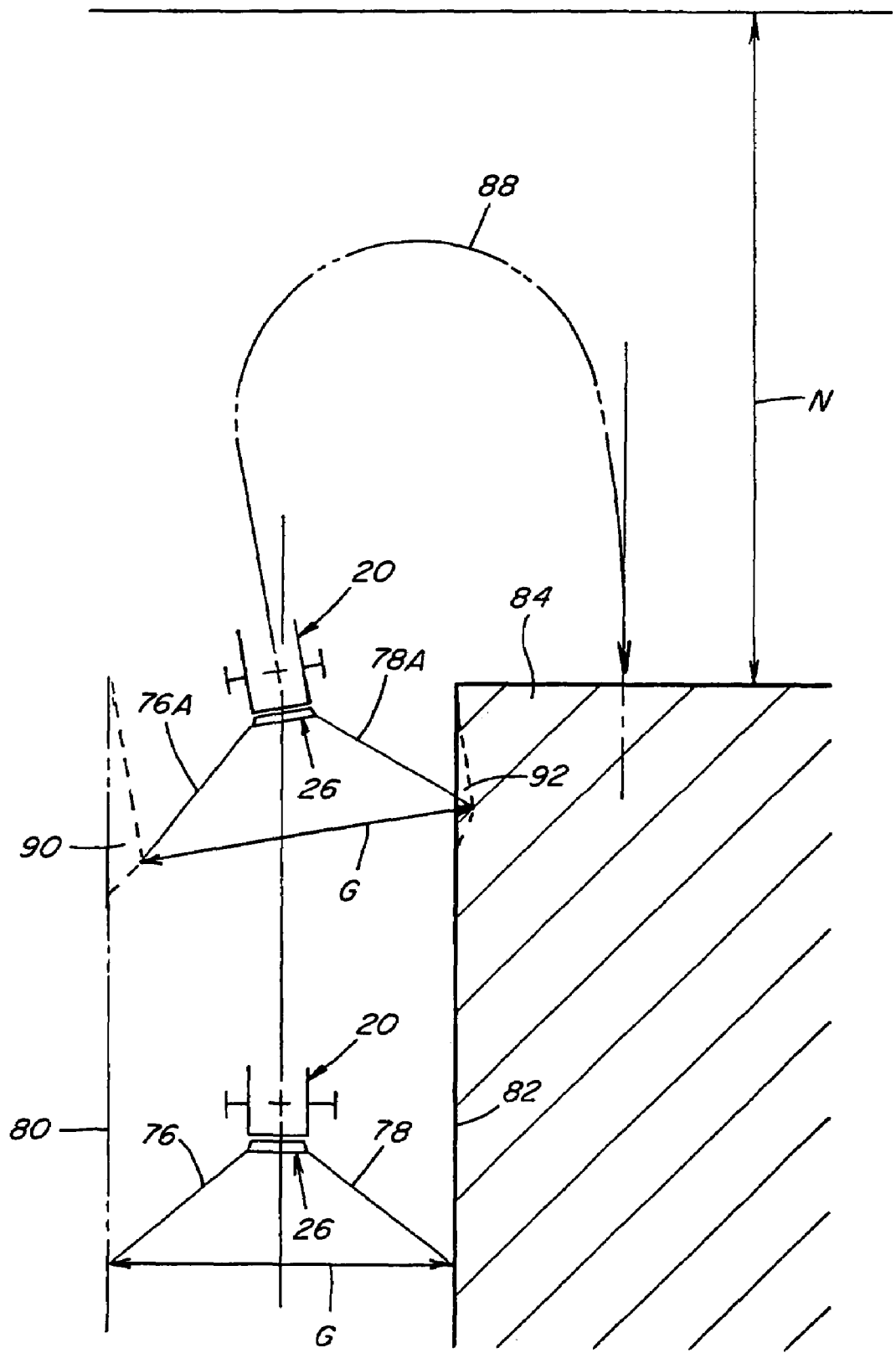
FIG. 7 is a sequence of simplified schematic top views of the rear end of the combine, a lower one of the views showing the spreader in the straight ahead position and a pattern of crop discharge therefrom, and the upper one of the views showing the spreader and the effect of an end of row turning maneuver on the location of crop residue deposition.

FIG. 7 illustrates combine 20 at a lower location on the page harvesting a swath of crops, denoted by edges 80 and 82, edges 76 and 78 of a crop residue flow from spreader 26 being adjusted to deposit crop residue in a pattern having sideward extent G extending across the swath. Combine 20 is also illustrated above in a turning maneuver, illustrated by line 88, wherein combine 20 is turned slightly to the left prior to execution of an end of row U-turn to the right in a headland, denoted by arrow N for harvesting an adjacent swath through region 84. Here, it can be observed that when combine 20 is turned initially to the left when executing turning maneuver 88, a terminal end of edge 76A of the crop residue flow will no longer be aligned with edge 80 of the swath, such that a wedge shape region 90 of the swath will not be covered by crop residue, whereas a portion of region 84 of the unharvested crop will be covered by crop residue, as denoted by region 92. It should be noted that the sideward extent G of the pattern of crop residue deposition remains the same.

Figure 8:
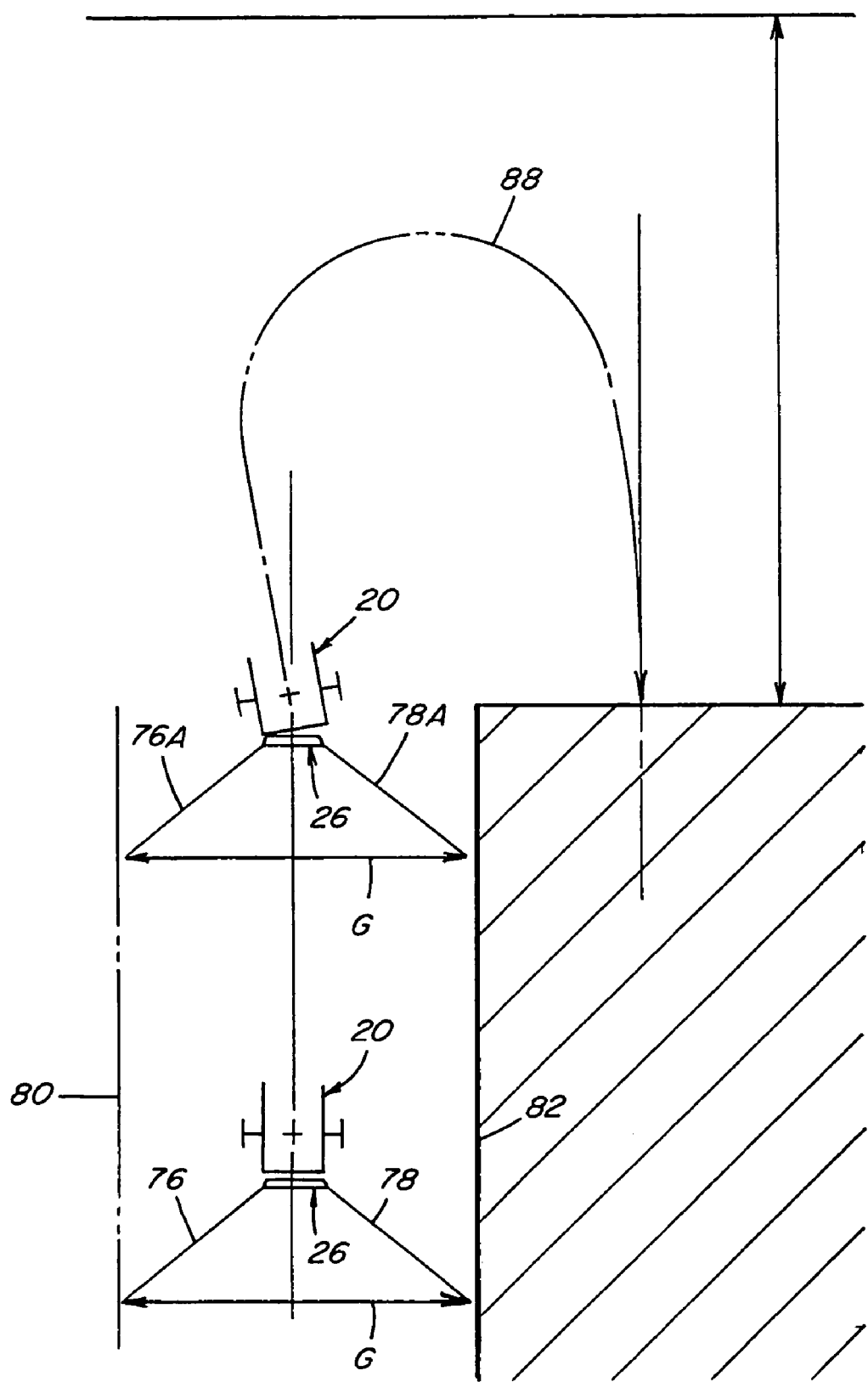
FIG. 8 is another sequence of simplified schematic top views of the rear end of the combine, a lower one of the views again showing the spreader in the straight ahead position and a pattern of crop discharge therefrom, and the upper one of the views showing the spreader in an adjusted position during an end of row turning maneuver.

Turning to FIG. 8, in the lower representation, combine 20 is shown as before with terminal ends of edges 76 and 78 of the crop residue flow from spreader 26 aligning with edges 80 and 82 of the swath, both having the sideward extent G. In the upper representation, combine 20 is shown turned to the left for initiating end of row turn 88 to the right, spreader 26 being shown pivoted to the left such that edges 76A and 78A of the crop residue flow therefrom remain aligned with edges 80 and 82 of the swath. Again, the sideward extent G of the pattern of crop residue deposition remains equal to the sideward extent of the swath, and the individual positions of the vanes of spreader 26 remain unchanged, such that the uniformity and consistency of the pattern of deposition is unchanged.

Figure 9:
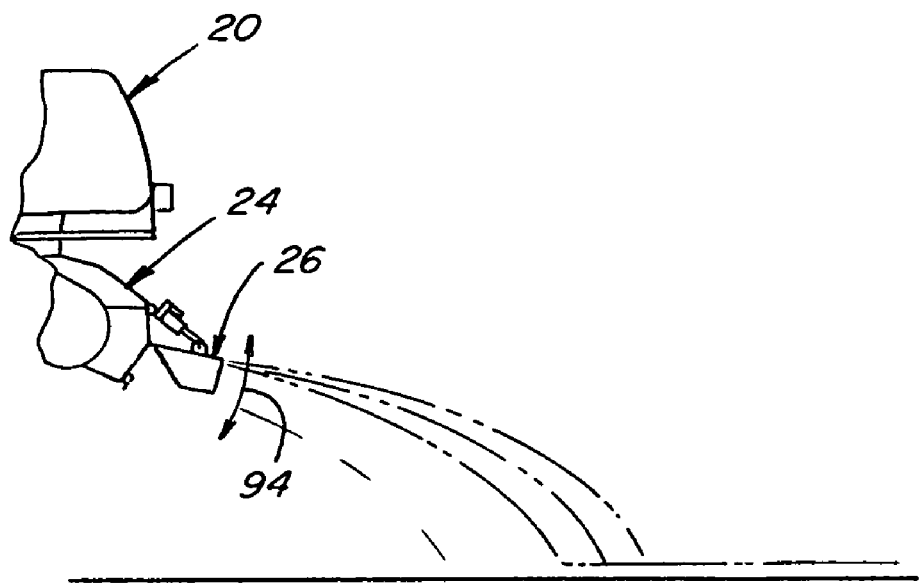
FIG. 9 is a fragmentary side view of the rear end of the combine showing the chopper and spreader, illustrating upward and downward adjustability of the spreader for achieving different crop deposition pattern widths.
Figure 10:
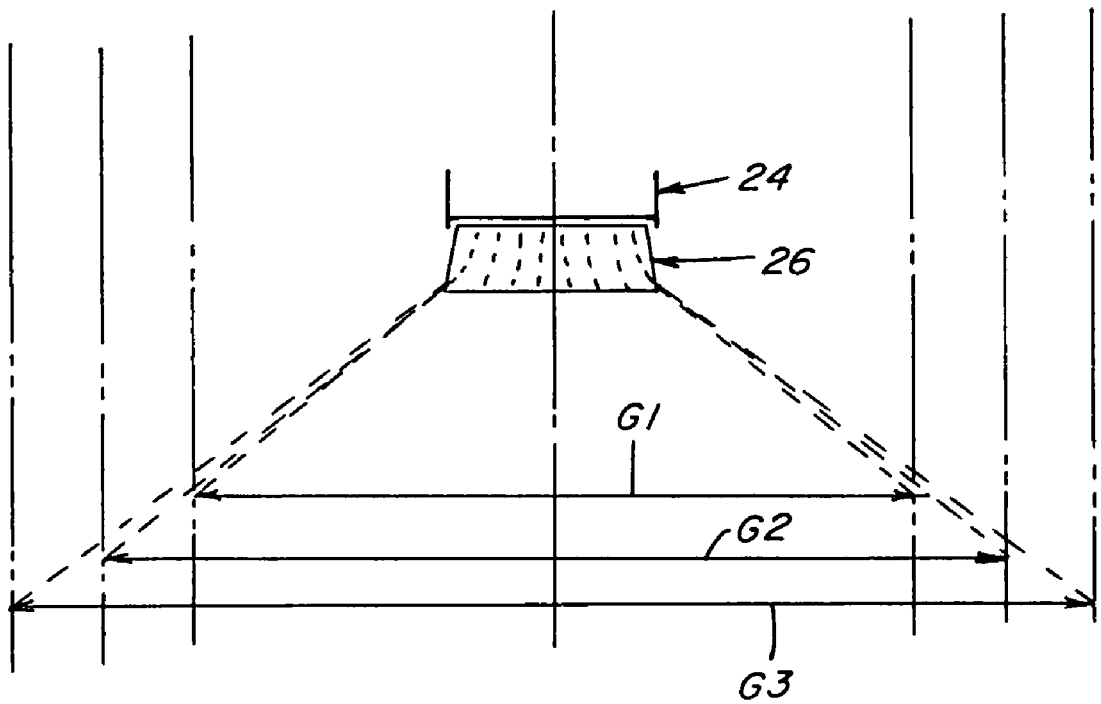
FIG. 10 is a simplified schematic top view of the chopper and spreader, illustration different crop deposition pattern widths.

Referring also to FIGS. 9 and 10, effects of upward and downward pivotal movement of spreader 26 relative to chopper 24 on combine 20 is shown, as denote by arrow 94 in FIG. 9. It is evident that by raising spreader 26 relative to chopper 24, the sideward extent of a pattern of crop residue deposition can be increased, as denoted by arrows G1, G2 and G3, which may be advantageous, for such purposes as adjusting for usage of headers of different widths.

Typical combines, such as combine 20, generally can utilize more than one header for harvesting different types of crops, such as grasses such as wheat and the like, and alternatively, corn or the like, such that the residue spread by spreaders 26 in conjunction with choppers 24 will have different flow characteristics. This can be due, for instance, to the different stalk and stem diameters and lengths of the different crops, pod sizes, cob sizes, and the like, and also moisture conditions. Additionally, different width heads may be used with a particular combine, and as a result it is often desired to alter the flow characteristics of the crop residue expelled from choppers 24. Whether or not a chopper 24 chops the residue will also be a factor. Thus, it should be appreciated that spreader 26 can be moved in the up and down directions to be positioned a desired angle for achieving desired crop residue distribution over a field, particularly in terms of sideward extent.

Figure 11:
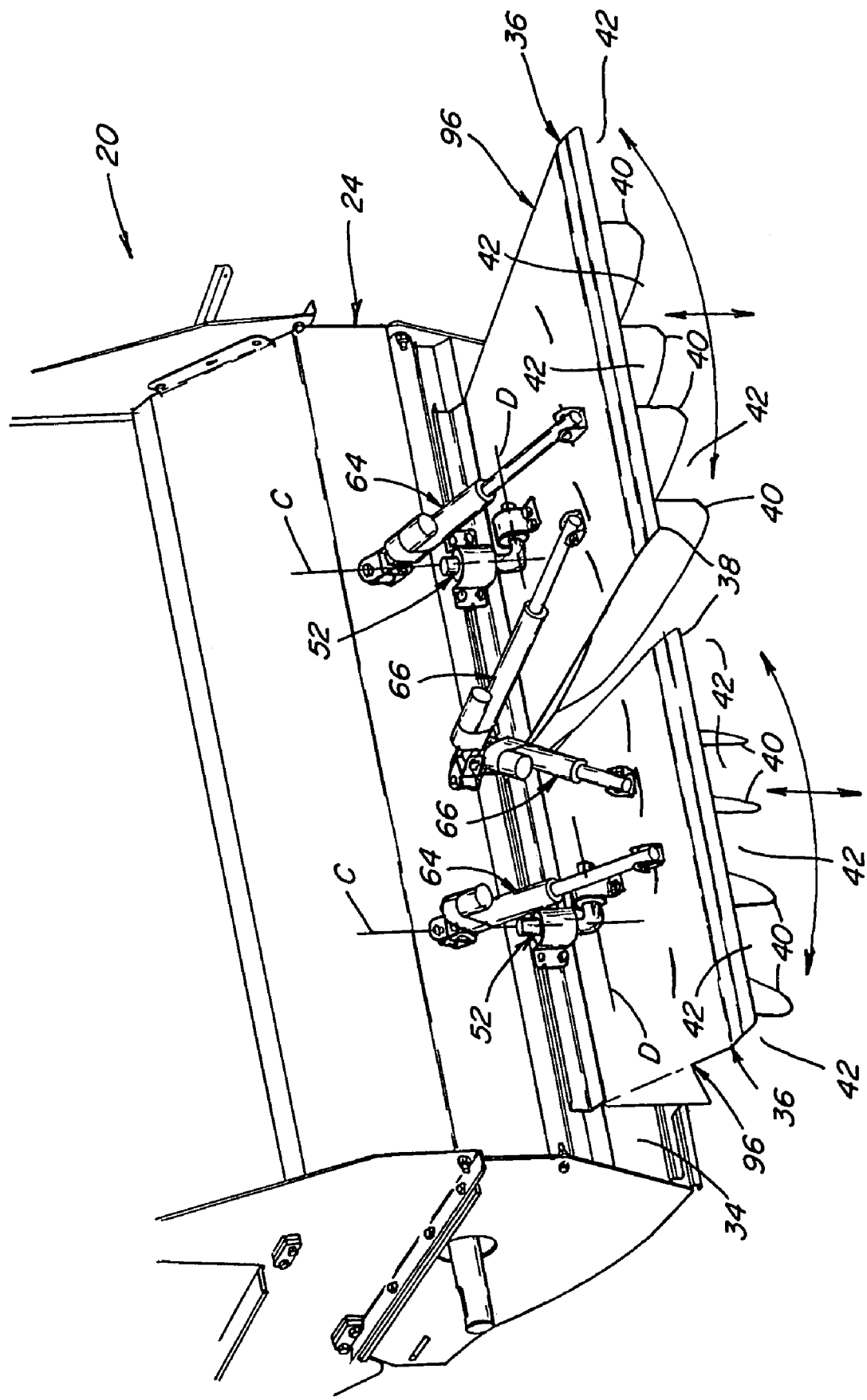
FIG. 11 is a fragmentary perspective view of the rear of the combine of FIG. 1, showing the chopper including two spreaders of the invention, illustrating possible directions of movement of the spreaders.

Referring to FIG. 11, combine 20 is shown including a crop residue chopper 24 mounted on the rear end thereof in the conventional manner, and operable for propelling a flow of crop residue therefrom, for deposition on a field by a pair of spreaders 96 constructed and operable according to the teachings of the present invention, like parts of spreaders 96 and spreader 26 being identified by like numbers. Each spreader 96 includes a spreader board 36 of sheet metal or like construction, including a plurality of vanes 40 extending therealong on a downwardly facing surface 38 thereof, extending generally between an upstream edge thereof, and a downstream edge. Spreader boards 36 are preferably positioned and used with surfaces 38 and vanes 40 directed downwardly as shown and as explained above. Again, in this position, vanes 40 extend downwardly into the flow of crop residue through discharge outlet 34 of chopper 24, for guiding the flow through flow channels 42, such that the crop residue will be deposited on a field in a desired pattern, particularly, having a desired sideward extent and uniformity of coverage.

As before, spreader boards 36 are each preferably mounted to and supported on chopper 24 or the rear end of combine 20 by a single pivot mount 52, so as to extend sidewardly at least generally horizontally across discharge outlet 34 of chopper 24, such that vanes 40 are positioned for guiding the crop flow for deposition on a field in a desired pattern. Also, again, utilizing a single pivot mount 52 for each of spreader boards 36 is advantageous as it simplifies construction, and provides the ability to pivot the spreader board 36 and vanes 40 simultaneously in a unitary manner, about upwardly and downwardly extending first pivotal axes C, for achieving positioning of a crop residue spread pattern on a field. Pivot mounts 52 are preferably constructed and mounted in the above-described manner. Each pivot mount 52 additionally preferably provides the capability for pivotal movement of the spreader board 36 and vanes 40 about a generally horizontal second pivotal axis D, in a unitary manner, to provide the additional adjustability described above. Actuators 64 and 66 are connected in the above-described manner to each of spreaders 96, to provide controlled pivotability, also in the above-described manner.

Figure 12:
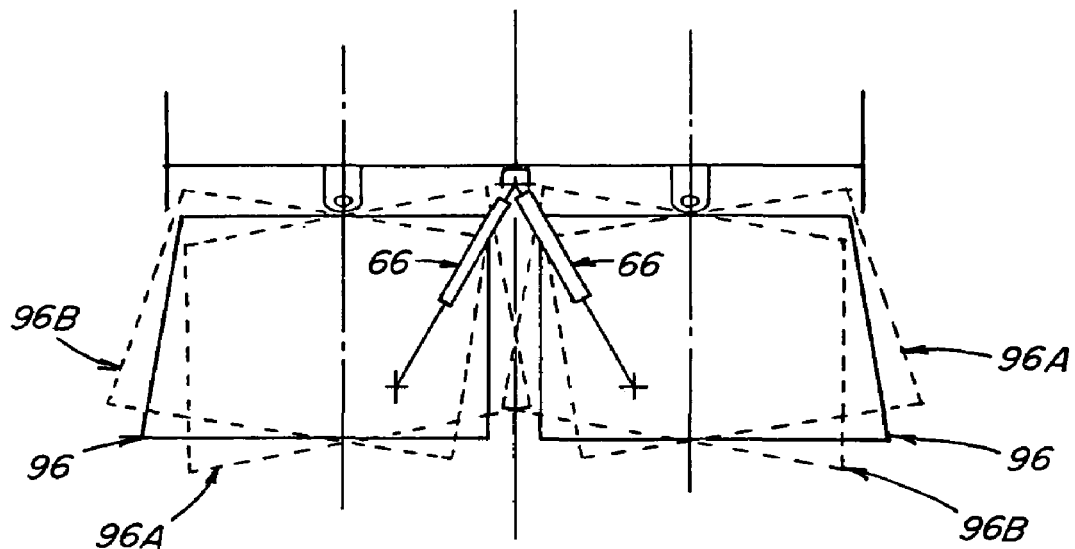
FIG. 12 is a simplified schematic top view of the chopper and spreaders of FIG. 11, the spreaders being in straight ahead positions, and the spreaders being illustrated in dotted lines in alternative positions.
Figure 13:
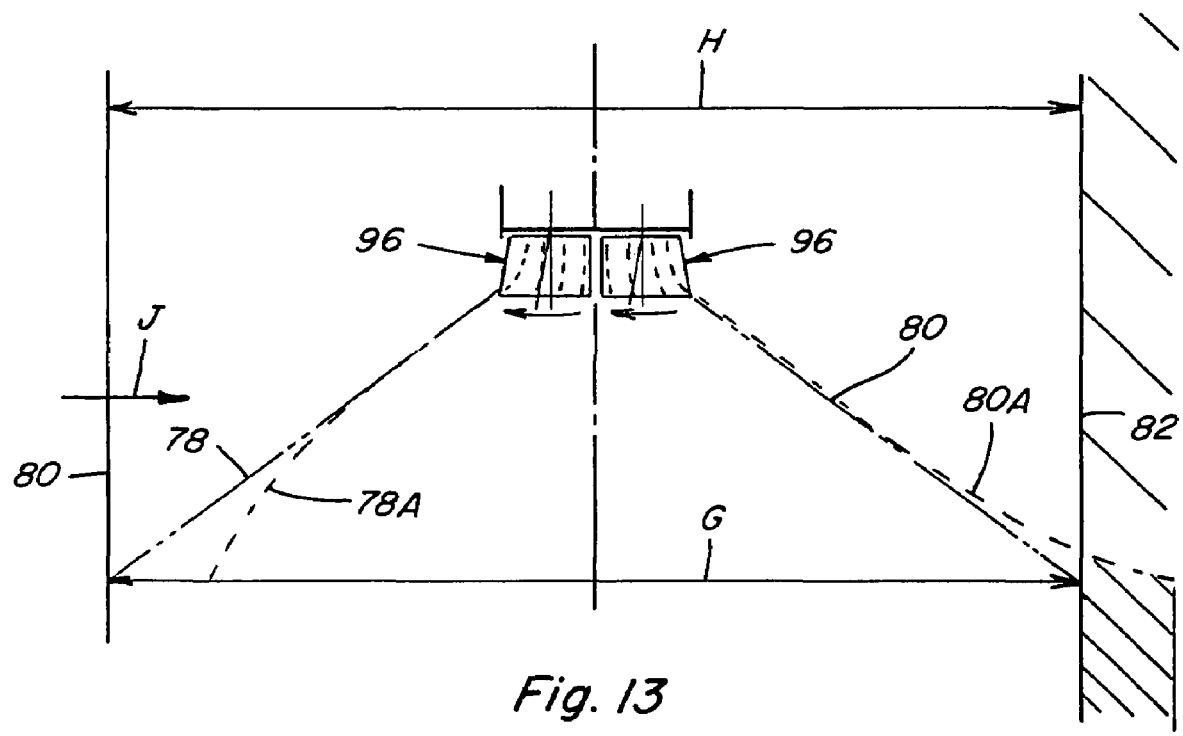
FIG. 13 is another simplified schematic top view of the chopper and spreaders of FIG. 11 with the spreaders in the straight ahead position, illustrating a discharge pattern of crop residue therefrom onto a field under no cross wind conditions, and in dotted lines illustrating effects of a cross wind condition on the location of deposition of the crop residue onto the field.

FIGS. 12 and 13 illustrate the advantages of the pivotability of spreaders 96. In FIG. 12, spreaders 96 are shown pivoted by actuators 66 to alternative positions 96A and 96B. In FIG. 13, spreaders 96 are shown pivoted to the left side, to shift the location of a pattern of crop residue deposition on a field, as denoted by the terminal ends of edges 76 and 78 of the crop flows, so as to be aligned with edges 80 and 82 of a swath, to compensate for a left to right side cross wind, as denoted by arrow J. Note here, that the sideward extent of the pattern of crop deposition, denoted by arrow G, equals the width of the swath, denoted by arrow H, as measured between edges 80 and 82 of the swath. Edges 76A and 78A of the crop flow, denoted by dotted lines, illustrate the effect of cross wind J without shifting of spreaders 96. Again, correction or compensation for wind conditions can be achieved without altering the individual orientations or locations of the vanes of spreaders 96, such that the consistency and uniformity of the pattern of crop residue deposition is not materially altered.

As another advantage, it should be appreciated that each spreader 96 can be controlled individually and adjusted, to achieve a desired crop residue flow and deposition on a field.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Spreader apparatus for a crop residue chopper of an agricultural harvesting machine, comprising:
    a spreader board including a surface having a plurality of vanes extending therealong defining a plurality of crop residue flow channels arranged in a row along the surface; and
    a pivot mount adapted to be mounted on a harvesting machine or a crop residue chopper for supporting the spreader board with the row of the crop residue flow channels extending at least generally horizontally across a discharge outlet of the crop residue chopper such that at least a substantial portion of a flow of crop residue propelled outwardly from the outlet will flow through the flow channels guided by the vanes so as to be deposited on a field on which the machine is located, the pivot mount supporting the spreader board and the vanes for unitary pivotal movement sidewardly about an upwardly and downwardly extending pivotal axis, to allow simultaneously altering an angular position of the spreader board and the vanes about the pivotal axis, wherein the pivot mount comprises an L shape pivot member having an upstanding end supported for rotation about the pivotal axis in a bushing mountable on a harvesting machine or a chopper, and a generally horizontal end received in a bushing mounted on the spreader board, to thereby allow unitary pivotability of the spreader board and the vanes about the pivotal axis and about a generally horizontal second axis.

2. Spreader apparatus of claim 1, further comprising an actuator or mechanical linkage connectable between a harvesting machine or a crop residue chopper and the spreader board, controllably operable fix jointly pivoting the spreader hoard and the vanes about the pivotal axis.

3. Spreader apparatus of claim 1, wherein the pivot mount is additionally configured to allow unitary pivotal movement of the spreader board and the vanes about a generally horitontal axis.

4. Spreader apparatus or claim 3, further comprising an actuator connectable between a harvesting machine for a crop residue chopper and the spreader board, controllably operable for jointly pivoting the spreader board and the varies about the generally horizontal axis.

5. Spreader apparatus of claim 1, wherein the vanes are each fixed in position on the spreader board.

6. Spreader apparatus of claim 1, wherein at least some of the vanes are adjustably mounted on the spreader board.

7. A crop residue chopper for an agricultural harvesting machine, comprising:
    a chopper housing having a discharge outlet through which crop residue is propelled outwardly therefrom:
    an at least generally planar, rigid spreader board including an upstream edge, a downstream edge opposite the upstream edge, and a surface extending therebetween, and a plurality of vanes extending outwardly from the surface defining a row of crop residue flow channels extending between the edges;
    a pivot mount supporting the spreader board with the upstream edge extending at least generally horizontally along a peripheral edge of the discharge outlet of the crop residue chopper such that at least a substantial portion of a flow of crop residue propelled outwardly from the outlet will flow through the flow channels guided by the vanes so as to be deposited on a field on which the machine is located, the pivot mount supporting the spreader board and the vanes for unitary pivotal movement about an upwardly and downwardly extending pivotal axis, to allow changing an angular position of the spreader board and the vanes about the pivotal axis, for adjusting a position on a field on which crop residue will be deposited wherein the pivot mount is additionally configured to allow unitary pivotal movement of the spreader board and the vanes about a generally horizontal axis; and
    an actuator connected between the housing and the spreader board, controllably operable for jointly pivoting the spreader board and the vanes about the generally horitontal axis.

8. Spreader apparatus of claim 7, further comprising an actuator or mechanical linkage connected between the housing and the spreader hoard and controllably operable for jointly pivoting the spreader board and the varies about the pivotal axis.

9. The spreader apparatus of claim 7, wherein the pivot mount comprises an L or T shape pivot member having an upwardly and downwardly extending end received for pivotal movement about the pivotal axis in a bushing mounted on the housing, and a generally horizontal end received in a bushing mounted on the spreader board, to thereby allow unitary pivotability of the spreader board and the vanes about the pivotal axis and about a generally horizontal second axis.

10. The spreader apparatus of claim 7, wherein at least some of the vanes are fixed in position on the spreader board.

11. The spreader apparatus of claim 7, wherein at least some of the vanes are adjustably mounted on the spreader board.

12. A crop residue chopper for an agricultural harvesting machine, comprising:
- a chopper housing having a discharge outlet through which crop residue is propelled outwardly therefrom;
- an at least generally planar, rigid spreader board including an upstream edge, a downstream edge opposite the upstream edge, and a surface extending therebetween, and a plurality of vanes extending outwardly from the surface defining a row of crop residue flow channels extending between the edges;
- a pivot mount supporting the spreader board with the upstream edge extending at least generally horizontally along a peripheral edge of the discharge outlet of the crop residue chopper such that at least a substantial portion of a flow of crop residue propelled outwardly from the outlet will flow through the flow channels guided by the vanes so as to be deposited on a field on which the machine is located, the pivot mount supporting the spreader board and the vanes for joint pivotal movement about an upwardly and downwardly extending first pivotal axis and an at least generally horizontal second pivotal axis, to allow changing angular positions of the spreader board and the vanes about the pivotal axes; and
- at least one actuator controllably operable for jointly pivoting the spreader board and the vanes shout the pivotal axes, respectively.

13. The chopper of claim 12, wherein the pivot mount comprises an L or T shape pivot member having an upwardly and downwardly extending end received for pivotal movement about the pivotal axis in a bushing mounted on the housing, and a generally horizontal end received in a bushing mounted on the spreader hoard, to thereby allow unitary pivotability of the spreader board and the vanes about the pivotal axes.

14. The chopper of claim 12, wherein at least some of the vanes are fixed in position on the spreader board.

15. The chopper of claim 12, wherein at least some of the vanes are adjustably mounted on the spreader board.

16. A method of spreading crop residue propelled from a crop residue chopper of an agricultural harvesting machine, comprising steps of;
- providing a crop residue spreader having a spreader board including a surface having a plurality of vanes extending therealong defining a plurality of crop residue flow channels arranged in a row along the surface;
- providing a pivot mount mounting the spreader on a harvesting machine with the row of the crop residue flow channels extending at least generally horizontally across a discharge outlet of a crop residue chopper of the harvesting machine such that at least a substantial portion of a flow of crop residue propelled outwardly from the outlet will flow through the flow channels guided by the vanes so as to be deposited on a field in a pattern having a predetermined shape and sideward extend, the pivot mount supporting the spreader board and the vanes for joint pivotal movement sidewardly about an upwardly and downwardly extending pivotal axis, for sidewardly shifting a location on a field onto which flow crop residue is deposited while substantially retaining the shape and sideward extent of the pattern thereof;
- jointly pivotally moving the spreader board and the vanes about the pivotal axis to sidewardly shift a location on a field onto which a flow of crop residue is to be deposited, while retaining the shape and sideward extent of the pattern thereof; and
- controllably operating at least one actuator for jointly pivoting the spreader board and the vanes about the pivotal axis.

17. The method of claim 16, wherein the step of jointly pivotally moving the spreader board and the vanes about the pivotal axis to sidewardly shift a location on a field onto which a flow of crop residue is to be deposited, while retaining the shape and sideward extent of the pattern thereof, is performed as the machine is executing a turning maneuver.

18. The method of claim 16, wherein the pivot mount mounting the spreader on a harvesting machine additionally supports the spreader board and the vanes for joint pivotal movement upwardly and downwardly about an at least generally horizontally extending pivotal axis, for varying at least the sideward extent of the pattern of crop residue deposited on a field.

19. The method of claim 16, wherein the step of jointly pivotally moving the spreader board and the vanes about the pivotal axis to sidewardly shift a location on a field onto which a flow of crop residue is to be deposited, is performed as the machine is moving over a field and harvesting crops from a swath thereof, so as to align sideward edges of the pattern of crop residue deposited on the field with side edges of the swath, while retaining the shape and sideward extent of the pattern.

* * * * *